United States Patent
Ramakrishna

(10) Patent No.: US 8,619,688 B2
(45) Date of Patent: Dec. 31, 2013

(54) SYSTEM AND METHOD FOR INDICATION OF CONTIGUOUS RESOURCE ALLOCATIONS IN OFDM-BASED SYSTEMS

(75) Inventor: Sudhir Ramakrishna, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 824 days.

(21) Appl. No.: 12/730,090

(22) Filed: Mar. 23, 2010

(65) Prior Publication Data

US 2010/0272036 A1    Oct. 28, 2010

Related U.S. Application Data

(60) Provisional application No. 61/214,792, filed on Apr. 28, 2009.

(51) Int. Cl.
*H04W 72/04* (2009.01)

(52) U.S. Cl.
USPC .......................... 370/329; 370/330; 370/341

(58) Field of Classification Search
None
See application file for complete search history.

(56) References Cited

U.S. PATENT DOCUMENTS

| | | | |
|---|---|---|---|
| 2007/0189197 A1 | 8/2007 | Kwon et al. | |
| 2008/0049690 A1* | 2/2008 | Kuchibhotla et al. | 370/338 |
| 2010/0246489 A1* | 9/2010 | Yang et al. | 370/328 |

FOREIGN PATENT DOCUMENTS

| | | |
|---|---|---|
| EP | 1 819 118 A2 | 8/2007 |
| KR | 1020070021914 A | 2/2007 |
| WO | WO 2008/081313 A2 | 7/2008 |
| WO | WO 2009/038350 A1 | 3/2009 |

OTHER PUBLICATIONS

European Search Report dated Jan. 5, 2012 in connection with European Patent Application No. EP 10 16 1289.

International Search Report dated Nov. 24, 2010 in connection with International Patent Application No. PCT/KR2010/002684.

Written Opinion of the International Searching Authority dated Nov. 24, 2010 in connection with International Patent Application No. PCT/KR2010/002684.

* cited by examiner

*Primary Examiner* — Huy D Vu
*Assistant Examiner* — Teisha D Hall

(57) ABSTRACT

A mobile station and base station are capable of communicating in a wireless network via a set of contiguous or non-contiguous sub-bands. The base station transmits a resource allocation to the mobile station. The resource allocation message includes a sub-band index (SBI) field, a number of messages field, a contiguous allocation indicator field, or a combination of these. Based on the SBI field, one or more of the number of messages field and contiguous allocation indicator field, the mobile station can identify the set of sub-bands allocated to it by the base station.

27 Claims, 8 Drawing Sheets

SYSTEM AND METHOD FOR INDICATION OF CONTIGUOUS RESOURCE ALLOCATIONS IN OFDM-BASED SYSTEMS

CROSS-REFERENCE TO RELATED APPLICATION(S) AND CLAIM OF PRIORITY

The present application is related to U.S. Provisional Patent Application No. 61/214,792, filed Apr. 28, 2009, entitled "METHODS FOR EFFICIENT INDICATION OF CONTIGUOUS RESOURCE ALLOCATIONS USING INFORMATION FIELDS OVER ONE OR MORE RESOURCE ALLOCATION MESSAGES IN OFDMA-BASED SYSTEMS". Provisional Patent Application No. 61/214,792 is assigned to the assignee of the present application and is hereby incorporated by reference into the present application as if fully set forth herein. The present application hereby claims priority under 35 U.S.C. §119(e) to U.S. Provisional Patent Application No. 61/214,792.

TECHNICAL FIELD OF THE INVENTION

The present application relates generally to wireless communications and, more specifically, to a system and method for indicating a contiguous resource allocation in an orthogonal frequency division multiplexing system.

BACKGROUND OF THE INVENTION

In a cellular communications system, a certain geographical region is divided into regions referred to as cells. The mobile stations (MSs) in each cell are served by a single base station (BS). A BS transmits information to a particular MS (or a group of MSs) in its cell on the radio path referred to as the downlink (DL), while the MSs transmit information to the BS on the radio path referred to as the uplink (UL). The transmissions on the UL and the DL may be on the same time intervals but on different frequency bands, referred to as frequency division duplexing (FDD), or on the same frequency band but during non-overlapping time intervals, referred to as time division duplexing (TDD). In some systems, the transmissions on the DL and UL are based on Orthogonal Frequency Division Multiplexing (OFDM) modulation. In OFDM modulation, the available bandwidth for the radio link (DL or UL) is divided into a large number of smaller-bandwidth units referred to as sub-carriers (SCs), onto which the information to be transmitted is embedded.

Due to OFDM modulation, on the UL, if the MSs in a cell simultaneously use non-overlapping SC sets to make transmissions to the BS, then when received at the BS, the transmission from any MS is rendered orthogonal to the transmission from any other MS. For example, MS(i) uses SC set $\{Si\}$ to perform UL transmissions to the BS; and the SC sets used by different MSs are non-overlapping. Then, when received at the MS, the transmissions from MS(i) on SC set $\{Si\}$ are not interfered with by any of the transmissions to the BS from any of the MSs j, where $j \neq i$.

Similarly, on the DL, if the BS uses non-overlapping SCs to make simultaneous transmissions to different MSs, then at any MS, the transmissions meant for other MSs appear orthogonal to the transmissions meant for it. For example, the BS can transmit to MS(i) using SC set $\{Si\}$, and use non-overlapping SC sets to perform transmissions to various MSs. Then, when received at MS(i), the transmissions from the BS on SC set $\{Si\}$ are not interfered with by any of the transmissions from the BS to any of the MSs j, where $j \neq i$. This property of OFDM modulation allows simultaneous communications between several MSs and the BS on the UL, and the BS and several MSs on the DL.

SUMMARY OF THE INVENTION

A mobile station capable of communicating with a base station in a wireless network is provided. The mobile station includes a plurality of antennas and a controller coupled to the plurality of antennas. The controller is configured to receive an allocation of a set of sub-bands for use in communicating with the base station. The controller receives a resource allocation message from the base station. The resource allocation message includes a sub-band index (SBI) field and at least one message field. The controller can use the SBI field and the at least one message field to determine the set of sub-bands.

A method for communicating with a base station in a wireless network is provided. The method includes receiving a resource allocation message from a base station. The resource allocation message is configured to identify an allocation of a set of sub-bands for use in communicating with the base station. The resource allocation message includes a sub-band index (SBI) field and at least one of message field. The method further includes determining the set of sub-bands using the SBI field and the at least one message field.

A base station capable of communicating with a mobile station in a wireless network is provided. The base station includes a plurality of antennas and a controller coupled to the plurality of antennas. The controller is configured to allocate a set of sub-bands to the mobile station. The controller is configured to transmit a resource allocation message to the mobile station. The resource allocation message includes a sub-band index (SBI) field and at least one message field. The resource allocation message is configured to be used to determine the set of sub-bands based on the SBI field and the at least one message field.

A method for communicating with a subscriber station in a wireless network is provided. The method includes transmitting at least one resource allocation message to the at least one subscriber station. The resource allocation message is configured to identify an allocation of a set of sub-bands including at least one sub-band for use in communicating by the at least one subscriber station. The resource allocation message includes a sub-band index (SBI) field, and at least one message field. The at least one resource allocation message is configured to be used to determine the set of sub-bands including at least one sub-band based on the SBI field and the at least one message field.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

With regard to the following description, it is noted that the LTE term "node B" is another term for "base station" used below. Further, the term "cell" is a logical concept that can represent a "base station" or a "sector" that belongs to a "base station". In the present disclosure, "cell" and "base station" are used interchangeably to indicate the actual transmission units (may be "sector" or "base station" and the like) in the wireless system. Also, the LTE term "user equipment" or "UE" is another term for "subscriber station" used below. It is noted that in all the following figures, some optional features are explicitly marked while some are omitted for clarity purpose.

Figure 1:
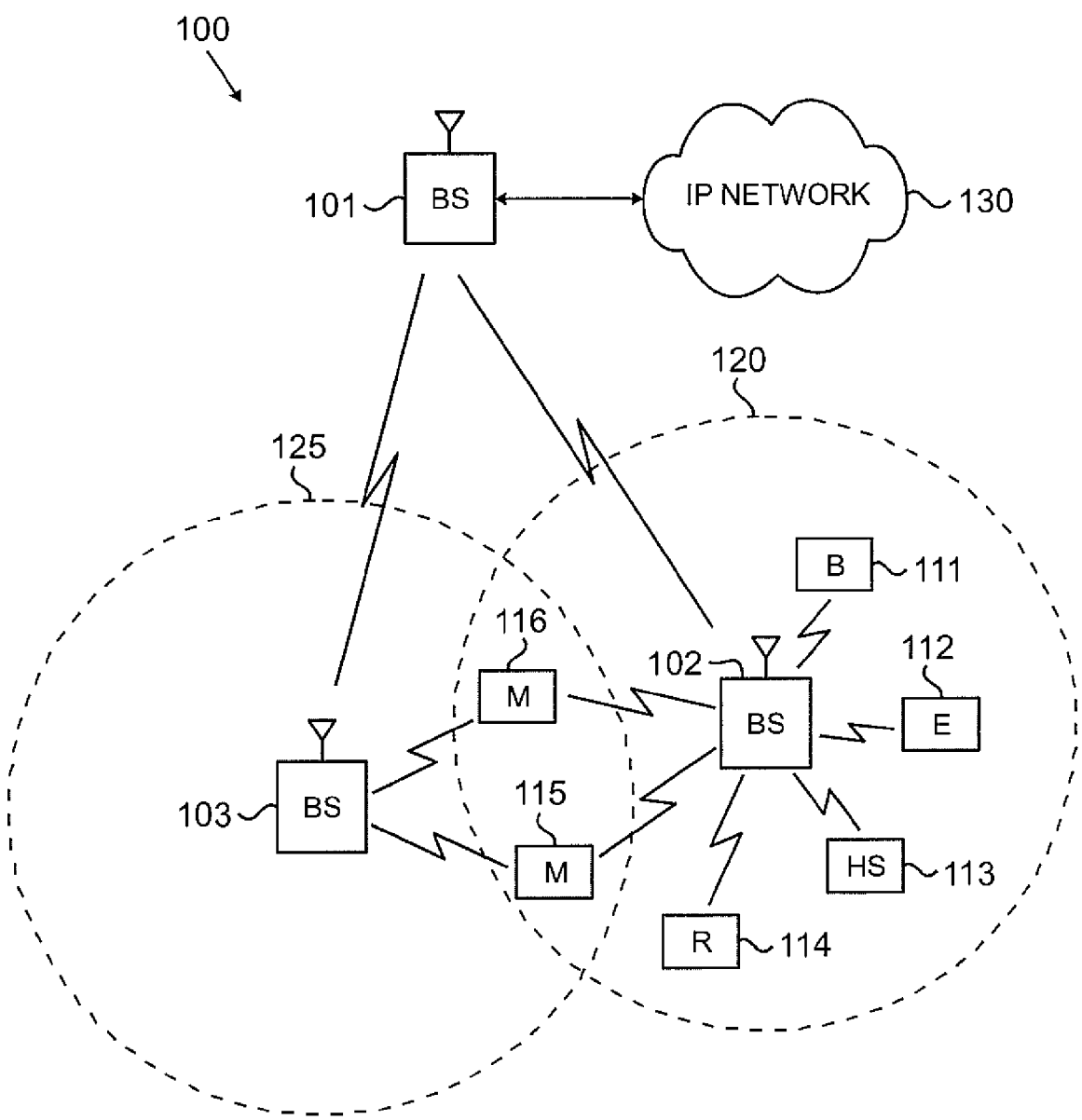
FIG. 1 illustrates exemplary wireless network 100 that is capable of decoding data streams according to embodiments of the disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (B), SS 112 may be located in an enterprise (E), SS 113 may be located in a WiFi hotspot (HS), SS 114 may be located in a residence, SS 115 may be a mobile (M) device, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet or other controller unit by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another, embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

In accordance with an embodiment of the present disclosure, one or more of base stations 101-103 and/or one or more of subscriber stations 111-116 include a receiver that is operable to decode a plurality of data streams received as a combined data stream from a plurality of transmit antennas using Minimum Mean Square Equalizer-Successive Interference Cancellation (MMSE-SIC) algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 include a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
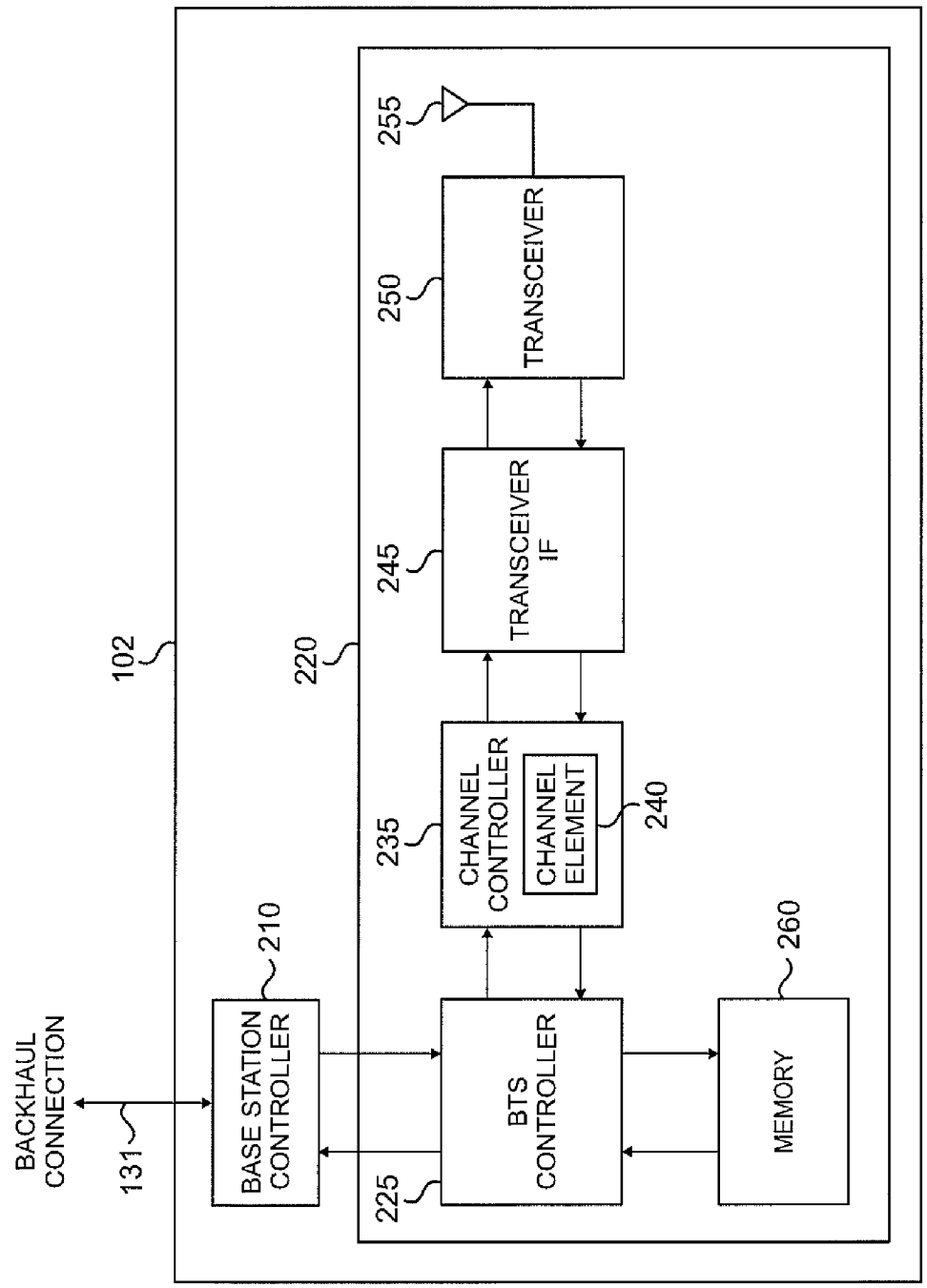
FIG. 2 illustrates exemplary base station in greater detail according to embodiments of the present disclosure.

FIG. 2 illustrates an exemplary base station in greater detail according to one embodiment of the present disclosure. The embodiment of base station 102 illustrated in FIG. 2 is for illustration only. Other embodiments of the base station 102 could be used without departing from the scope of this disclosure.

Base station 102 comprises base station controller (BSC) 210 and base transceiver subsystem (BTS) 220. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 120 and 125 and the base station controller associated with each base transceiver subsystem are collectively represented by BS 102 and BS 103, respectively.

BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a memory 260. The embodiment memory 260 included within BTS 220 is for illustration only. Memory 260 can be located in other portions of BS 102 without departing from the scope of this disclosure.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). In an advantageous embodiment of the present disclosure, the channel elements communicate according to an OFDMA protocol with the mobile stations in cell 120. Transceiver IF 245 transfers the bi-directional channel signals between channel controller 240 and RF transceiver unit 250. The embodiment of RF transceiver unit 250 as a single device is for illustration only. RF transceiver unit 250 can separate transmitter and receiver devices without departing from the scope of this disclosure.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments of the present disclosure, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments of the present disclosure, BTS controller 225 is operable to execute programs, such as an operating system (OS) and processes for resource allocations, stored in a memory 260. Memory 260 can be any computer readable medium, for example, the memory 260 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 260 comprises a random access memory (RAM) and another part of memory 260 comprises a Flash memory, which acts as a read-only memory (ROM).

BSC 210 is operable to maintain communications between BS 102 and BS 101 and BS 103. BS 102 communicates to BS 101 and BS 103 via the wireless connection 131. In some embodiments, the wireless connection 131 is wire-line connection.

Figure 3:
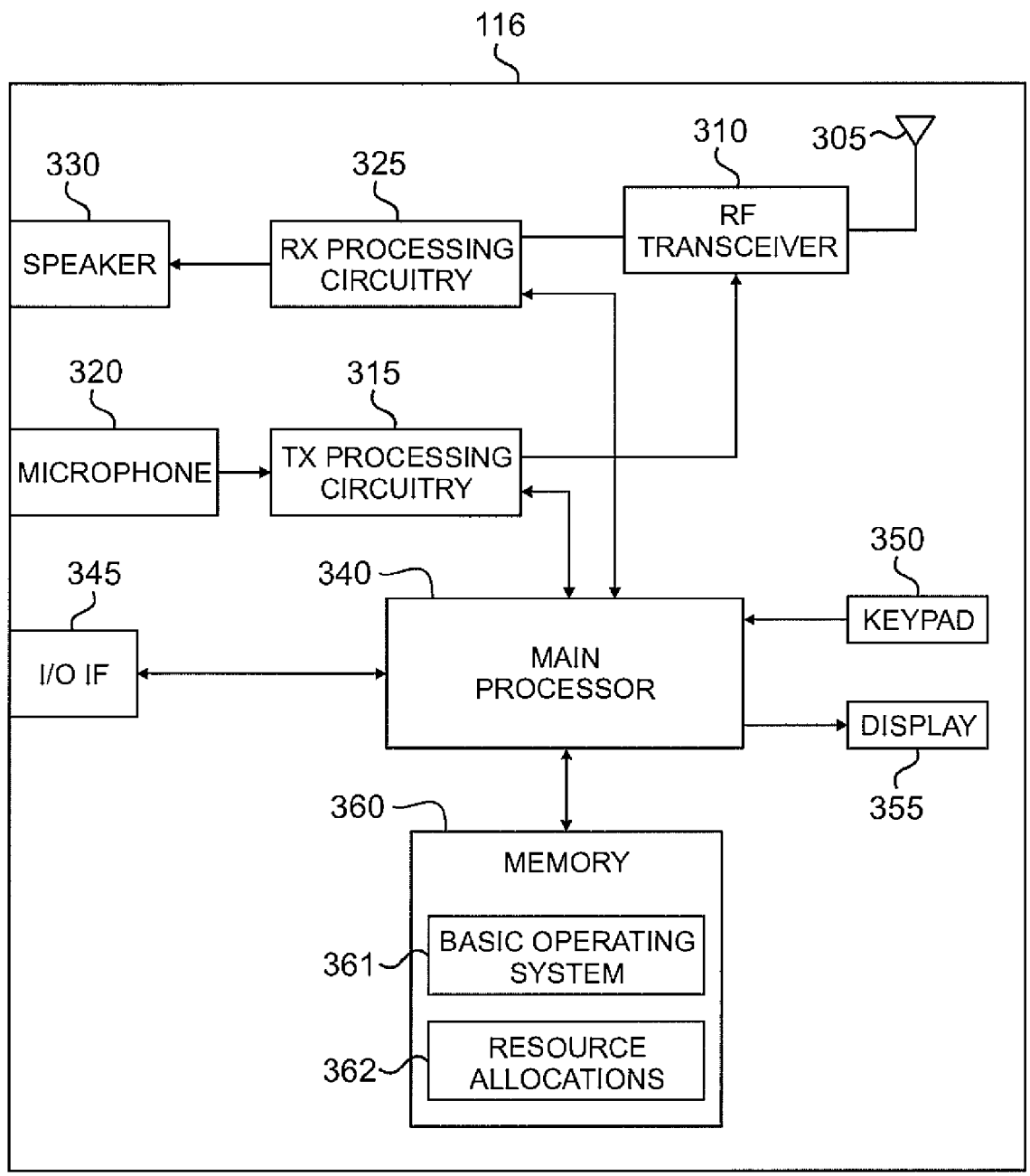
FIG. 3 illustrates an exemplary wireless mobile station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and applications and/or instructions for determining resource allocations 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. In some embodiments, the main processor 340 is configured to execute programs, such as processes for determining resource allocations 362. The main processor 340 can execute processes for determining resource allocations 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

Figure 4:
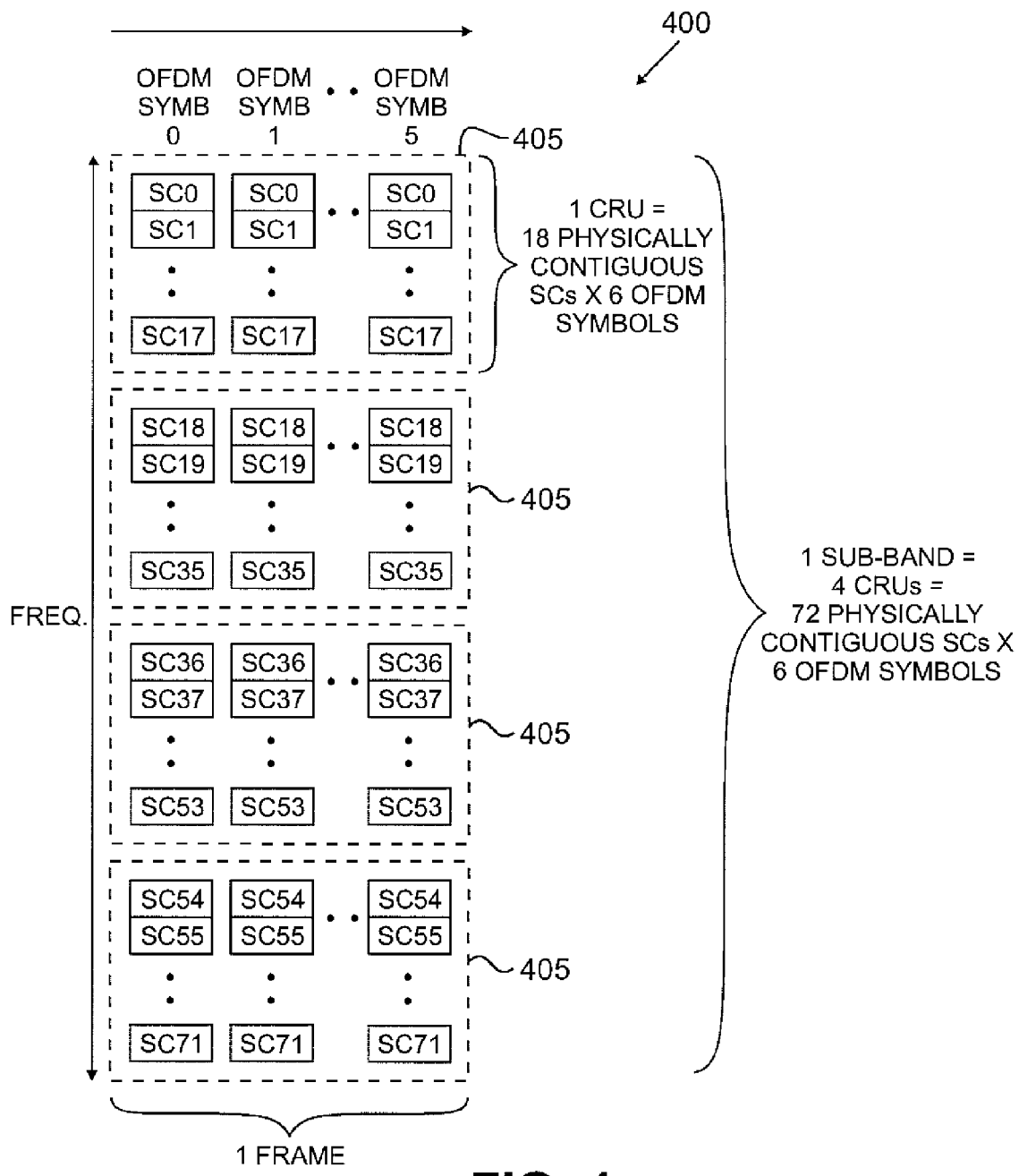
FIG. 4 illustrates a sub-band with a number of contiguous resource units (CRUs) according to embodiments of the present disclosure.

FIG. 4 illustrates a sub-band with a number of contiguous resource units (CRUs) according to embodiments of the present disclosure. The embodiment of the sub-band 400 shown in FIG. 4 is for illustration only. Other embodiments could be used without departing from the scope of this disclosure.

In the OFDM-based system, the basic time unit over which the transmissions (from BS 102 to SS 111-116, and from SS 111-116 to BS 102) occur is called an OFDM symbol. On the UL, the transmissions by SS 111-116 are coordinated to ensure that non-overlapping SC sets are being used, and each SS has been instructed, by BS 102, as to which SC set to use for transmissions to BS 102. Similarly, on the DL, BS 102 uses non-overlapping SC sets to make transmissions to SS 111-116, and the SSs are instructed, by BS 102, as to which SC sets to listen to receive the transmissions meant for them.

The instructions to the SSs, whether regarding which SC set to use for UL transmissions, or which SC set on which to receive DL transmissions, are referred to as Resource Allocation Messages. The resource allocation messages are transmitted by BS 102 on an SC set referred to as the Resource Allocation Region. For example, several resource allocation messages, each meant for a particular SS or a group of SSs, are carried on SCs that are part of the Resource Allocation Region.

Each of SS 111-116 is aware of the resource allocation region; and each of SS 111-116 receives, decodes and interprets the resource allocation messages in the resource allocation region to learn about the SC set it is to use for UL transmissions and/or the set on which it is to receive DL transmissions.

The SC sets that are available for transmissions by BS 102 to SS 111-116 on the DL, and by SS 111-116 to BS 102 on the UL, are classified into two broad categories: distributed resources and contiguous resources. It is first noted that a logical index of a resource is the index with which it is referred to in allocations, and which, along with a convention for translation to physical resources, allows a BS or an SS to determine which physical resource to which the allocation refers.

Distributed resources are collections of distributed resource units, where a Distributed Resource Unit (DRU) is a subset of a known size (in the number of SCs and OFDM symbols), of logical indices of SCs, in which SCs that are contiguous with respect to their logical indices are not physically contiguous with respect to their location in the physical bandwidth of transmission. Transmitting on distributed resources allows the receiver to experience the average channel conditions over the entire, or a relatively large portion of, the total available bandwidth.

Contiguous resources are collections of contiguous resource units, where a Contiguous Resource Unit (CRU) 405 is a subset of a known size (in the number of SCs and OFDM symbols), of logical indices of SCs consisting of physically contiguous SCs, i.e., in which the component SCs that have contiguous logical indices are also physically contiguous.

The sub-band (SB) 400 consists of a pre-determined (known to all BSs and all SSs) number of CRUs 405, such that the set of SCs in the sub-band are physically contiguous. SB 400 resources can be utilized in order to perform "frequency selective" transmissions. SB 400 can span a small portion of the overall available bandwidth, or "sample" a small portion of the overall bandwidth. Due to the fact that the all the SCs in SB 400 are physically contiguous, the channel conditions across them may be expected to be similar in many cases. An SS, such as SS 116, may experience a wide variation in radio channel conditions across the entire bandwidth. SS 116 can estimate the radio channel conditions across the many SBs 400 that make up the entire bandwidth, and feed them back to BS 102. BS 102 can then schedule transmissions to the SS 116 on only the good SBs 400.

FIG. 4 illustrates one frame in a Worldwide Interoperability for Microwave Access (WiMAX) system. For example, a CRU 405 consists of an SC-OFDM symbol grid consisting of eighteen physically contiguous SCs per OFDM symbol×six OFDM symbols. The SB 400 can include four CRUs 405; forming a grid of seventy-two contiguous SCs×six OFDM symbols. The 72 SCs in the sub-band are physically contiguous. It will be understood that illustration of SB 400 comprising six OFDM symbols and four CRUs 405, each with eighteen SCs, is for example purposes only and embodiments with different numbers of symbols, CRUs and SCs could be used without departing from the scope of this disclosure. Additionally, due to other numerology, there are twelve SBs in a 10 MHz system, and twenty-four in a 20 MHz system.

The IEEE 802.16e system described in IEEE Std. 802.16e-2005, IEEE Standard for Local and metropolitan area networks,—Part 16: Air Interface for fixed and mobile broadband wireless access systems,—Amendment 2: Physical and Medium Access Control Layers for Combined Fixed and Mobile Operation in Licensed Bands, and IEEE Std. 802.16-2004/Cor1-2005, Corrigendum 1, December 2005, the contents of which hereby are incorporated by reference in their entirety, is an example of an OFDM based system employing some of the above descriptions. In the IEEE 802.16e system, the resource allocation messages are referred to as MAP messages and the resource allocation region is referred to as the MAP-Region.

The IEEE 802.16m system described in IEEE 802.16m-09/0010r1, "Part 16: Air Interface for Fixed and Mobile Broadband Wireless Access Systems", March 2008, the contents of which hereby are incorporated by reference in their entirety, is another example of an OFDM based system employing the above descriptions. In the IEEE 802.16m system, the following specializations apply.

Focusing on the SB resources, we consider now the issue of allocation of SB resources to SS 116, that is, informing SS 116 to receive transmissions on particular SBs on the DL, or perform transmissions on particular SBs on the UL. In order to utilize SBs to perform transmissions on portions of the bandwidth where the radio link is good, the ability to be able to signal sets of SBs with non-contiguous logical indices is important.

Figure 5:
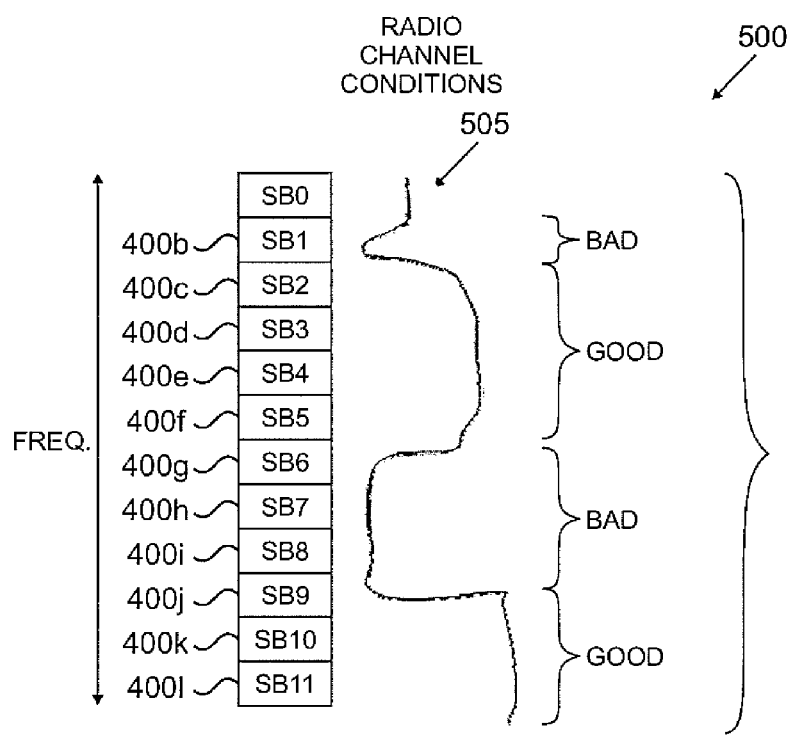
FIG. 5 illustrates exemplary radio channel conditions across sub-bands according to embodiments of the present disclosure.

FIG. 5 illustrates exemplary radio channel conditions across sub-bands according to embodiments of the present disclosure. FIG. 5 depicts a 10 MHz system 500. The 10 MHz system 500 includes twelve SBs 400. The radio channel conditions 505 vary across the SBs 400. For example, the radio channel conditions 505 are poor in SB1 400b, SB6 400g, SB7 400h, and SB8 400i. However, the radio channel conditions are good in SB2 400c, SB3 400d, SB4 400e, SB5 400f, SB9 400j, SB10 400k and SB11 400l.

BS 102 can allocate a number of resources to SS 116. BS 102 then transmits the resource allocations to SS 116. Additionally, BS 102 allocates a number of resources to SS 115 and transmits the resource allocation to SS 115. For example, referring to FIG. 5, BS 102 can allocate SB2 400c, SB3 400d, SB4 400e, SB5 400f, SB9 400j, SB10 400k and SB11 400l to SS 116. SB2 400c, SB3 400d, SB4 400e, SB5 400f, SB9 400j, SB10 400k and SB11 400l have non-contiguous resource indices.

Figure 6:
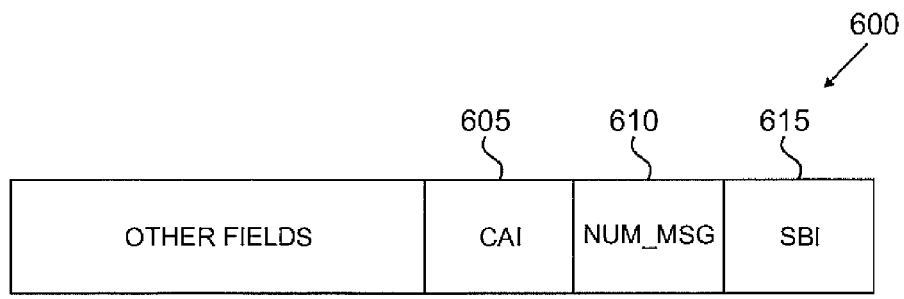
FIG. 6 illustrates a resource allocation message according to embodiments of the present disclosure.

FIG. 6 illustrates a resource allocation message according to embodiments of the present disclosure. The embodiment of the resource allocation message 600 shown in FIG. 6 is for illustration only. Other embodiments could be used without departing from the scope of this disclosure.

BS 102 transmits the resource allocation message 600 to SS 116. The resource allocation message 600 can include a contiguous allocation indicator (CAI) 605. The CAI 605 can be a single- or multi-bit field, referred to as a CONTIGUOUS_ALLOCATION_INDICATOR field, which includes information configured to allow SS 116 to interpret at least a portion of the resource allocation.

The resource allocation message 600 can include a number of messages indicator 610. The number of messages indicator 610 can be a multi-bit field, referred to as a NUM_MSGS_CARRYING_ALLOCATION field, which is configured to enable SS 116 to infer the number of resource allocation messages over which the allocation is carried. The NUM_MSGS_CARRYING_ALLOCATION is configured to be "1" (N=1) or a value that is more than "1" (N>1).

The resource allocation message 600 can include a Sub-band Index (SBI) field 615. The SBI field 615 can be a multi-bit field that is configured to enable SS 116 to infer the indices of the allocated SBs.

In some systems, the fields in the resource allocation message can be limited in the size, in number of bits allowed to be used. For example, a total number of distinct allocations of SBs may exceed what can be indicated by the allowed size of the field in a resource allocation message. In some examples, only a portion of the possible allocations are indicated in a single message, and the allocation message is designed with the number of bits to cover the most likely cases. In some examples, the allocation is indicated across multiple messages.

In some embodiments, a concatenation rule is employed. The concatenation rule allows the efficient combination of the SBI field to indicate a wide range of allocations with multiple messages, in a completely flexible way. For example, in the case of twelve SBs and a 7-bit SBI field 615, one-hundred twenty-eight (128) combinations of SB allocation can be indicated with the seven bits. However, when two allocation messages are used, according to the concatenation rule, one concatenated allocation message includes fourteen bits for indexing. The first twelve bits can be used as a bit map to convey an arbitrary allocation of twelve SBs.

In some examples, the radio channel conditions for a mobile are similar over the entire bandwidth or a large portion of the bandwidth; these are referred to as "frequency flat" channels. In such examples, BS 102 is configured to allocate contiguous SBs. Accordingly, SS 116 is able to interpret the SBI field 615 depending upon whether or not one makes contiguous or non-contiguous allocations.

Figure 7:
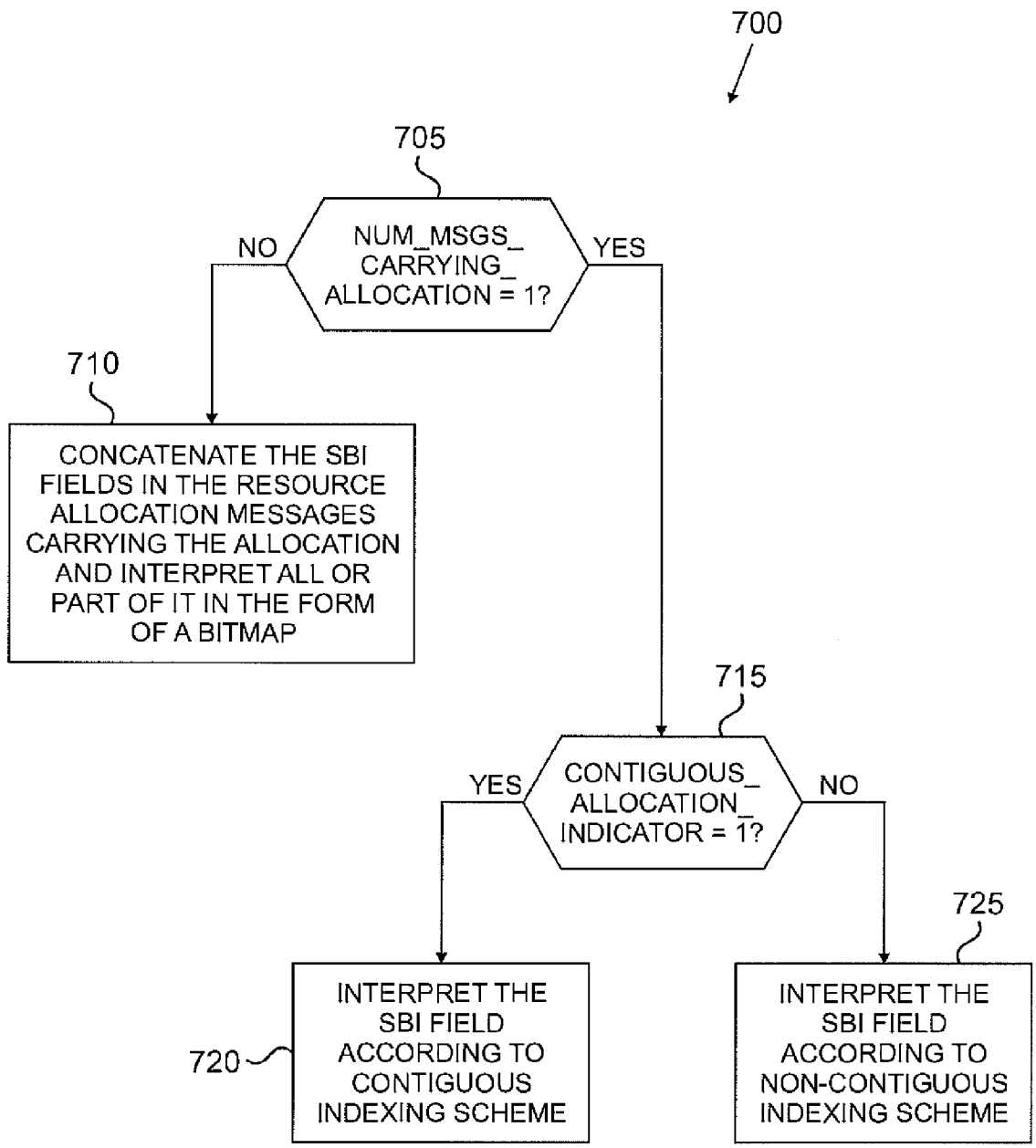
FIGS. 7 and 9 illustrate a processes for interpreting resource allocations according to embodiments of the present disclosure.

FIG. 7 illustrates a process for interpreting resource allocations according to embodiments of the present disclosure. The embodiment of the process 700 shown in FIG. 7 is for illustration only. Other embodiments could be used without departing from the scope of this disclosure.

SS 116 receives the resource allocation message 600 from BS 102. The resource allocation message includes the CAI 605, the number of messages indicator 610, and the SBI field 615. In block 705, SS 116 determines if the number of messages indicator 610 indicates that the allocation is included in one allocation message or more than one allocation messages. For example, SS 116 determines if "NUM_MSGS_CARRYING_ALLOCATION=1."

If SS 116 determines that more than one message includes the allocation, that is "NUM_MSGS_CARRYING_ALLOCATION>1," then SS 116 concatenates the SBI field 615 in block 710. SS 116 concatenates all the SBI fields 615 in all the resource allocation messages carrying the allocation. SS 116 can interpret all or parts of the allocations in the form of a bitmap. For example, each position in the concatenated SBI field 615 can correspond to a logical index of a particular SB 400. A "1" can indicate that the corresponding SB has been allocated and a "0" can indicate that the corresponding SB 400 has not been allocated. Thereafter, SS 116 can utilize the allocated SBs for UL and DL communications with BS 102.

If SS 116 determines that only one message includes the allocation, that is "NUM_MSGS_CARRYING_ALLOCATION=1," then SS 116 determines a value of the CAI 605 in block 715. Based on the value of the CAI 605, such as "CONTIGUOUS_ALLOCATION_INDICATOR=1," SS 116 interprets the SBI field 615 according to a contiguous indexing scheme in block 720. The contiguous indexing scheme provides an allocation of SBs 400 with contiguous logical indices. For example, in the contiguous indexing scheme, a portion of the SBI 615 can specify the lowest SB logical index in the allocation, another portion of the SBI 615 can specify the highest SB logical index in the allocation, and the allocation can consists of all SBs 400 with logical indices that lie between, including the lowest and highest indicated indices. Therefore, SS 116 can use a portion of the SBI 615 to identify the beginning of a contiguous allocation of SBs 400 and another portion of the SBI 615 to identify the end of the contiguous allocation of SBs 400. Thereafter, SS 116 can utilize the allocated SBs for UL and DL communications with BS 102.

Alternatively, based on the value of the CAI 605, such as "CONTIGUOUS_ALLOCATION_INDICATOR=0," SS 116 interprets the SBI field 615 according to a non-contiguous indexing scheme in block 725. The contiguous indexing scheme provides an allocation of SBs 400 with non-contiguous logical indices. Thereafter, SS 116 can utilize the allocated SBs for UL and DL communications with BS 102.

Figure 8:
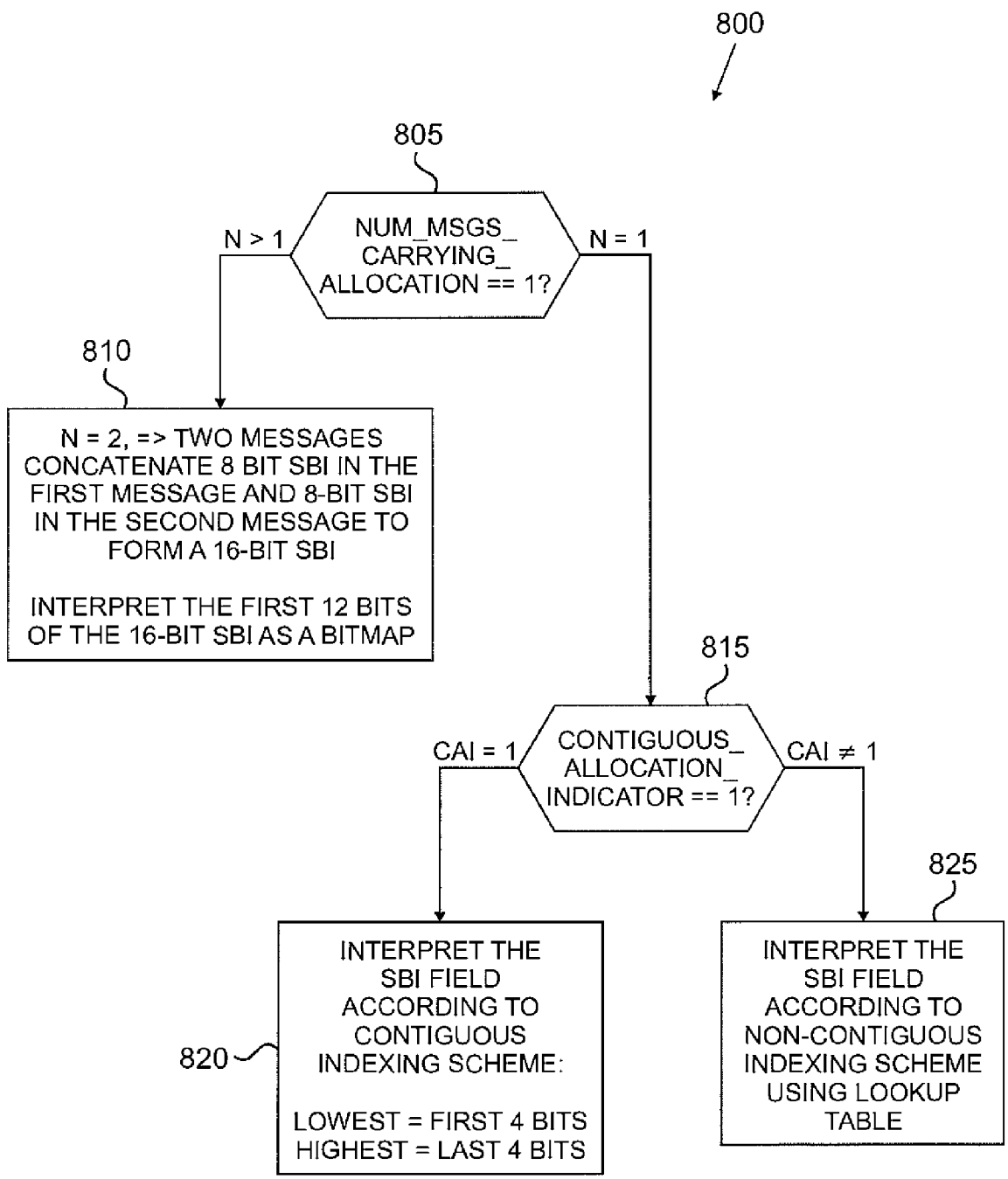
FIG. 8 illustrates an example of the process for interpreting resource allocations according to embodiments of the present disclosure.

FIG. 8 illustrates an example of the process for interpreting resource allocations according to embodiments of the present disclosure. The example process 800 shown in FIG. 8 is for illustration only. Other examples could be used without departing from the scope of this disclosure.

SS 116 receives the resource allocation message 600 from BS 102 in a 10 MHz 802.16m system (e.g., twelve SBs 400). The resource allocation message includes the CAI 605, the number of messages indicator 610, and the SBI field 615. In block 805, SS 116 determines if the number of messages indicator 610 indicates that the allocation is included in only one message. For example, SS 116 determines if "NUM_MSGS_CARRYING_ALLOCATION=1."

In one example, SS 116 can determine that the number of messages indicator 610 indicates that the allocation is included in two messages (i.e., N=2). As such, SS 116 determines that the allocation is carried in more than one message, that is "NUM_MSGS_CARRYING_ALLOCATION>1" in block 805. Therefore, SS 116 concatenates the SBI field 615 in block 810. SS' 116 concatenates the 8-bit SBI field 615 in the first message and the 8-bit SBI field 615 in the second message to form a 16-bit SBI field. SS 116 interprets the first twelve bits of the sixteen bits included in the 16-bit SBI field as a bit map. For example, SS 116 can interpret the bit map as a truth table, such as:

With $0 \leq j < 12$;

Bit position $j=0 \Rightarrow$ SB j is not allocated;

Bit position $j=1 \Rightarrow$ SB j is allocated;

In another example, SS 116 can determine that the number of messages indicator 610 indicates that the allocation is included in one messages (i.e., N=1). As such, SS 116 determines that only one message includes the allocation, that is, "NUM_MSGS_CARRYING_ALLOCATION=1" in block 805. Therefore, SS 116 determines a value of the CAI 605 in block 815. Based on the value of the CAI 605, such as "CONTIGUOUS_ALLOCATION_INDICATOR=1," in one example, SS 116 interprets the SBI field 615 according to a contiguous indexing scheme in block 820. The contiguous indexing scheme provides an allocation of SBs 400 with contiguous logical indices. SS 116 uses the first four bits of the 8-bit SBI 615 to identify a Lowest_SB_Index. Four bits can be enough to indicate sixteen values, wherein only twelve SBs 400 are available in the 802.16M 10 MHz system. SS 116 uses the last four bits of the 8-bit SBI field 615 to identify the Highest_SB_Index. The allocation can consist of all SBs 400 with logical indices that lie between. The allocation includes the Lowest_SB_Index and Highest_SB_Index such that: Lowest_SB_Index≤SB≤Highest_SB_Index.

Alternatively, based on the value of the CAI 605, such as "CONTIGUOUS_ALLOCATION_INDICATOR-0," SS 116 interprets the SBI field 615 according to a non-contiguous indexing scheme in block 825. SS 116 interprets the 8-bit SBI using a look-up table (LUT) or a set of LUTs. For each of the two-hundred fifty-six (256) values of the SBI field 615, the LUT indicates a particular combination of SB 400 allocations.

In some embodiments, the number of messages indicator 610 (i.e., the NUM_MSGS_CARRYING_ALLOCATION field) is not transmitted as a part of the resource allocation message 600. SS 116 is able to determine the number of resource allocation messages carrying the allocation implicitly through other means. The interpretation conventions remain the same as those in FIG. 7 (e.g., blocks 710, 715, 720 and 725); however, the NUM_MSGS_CARRYING_ALLOCATION field is replaced by knowledge from other means of the number of resource allocation messages carrying the allocation.

Figure 9:
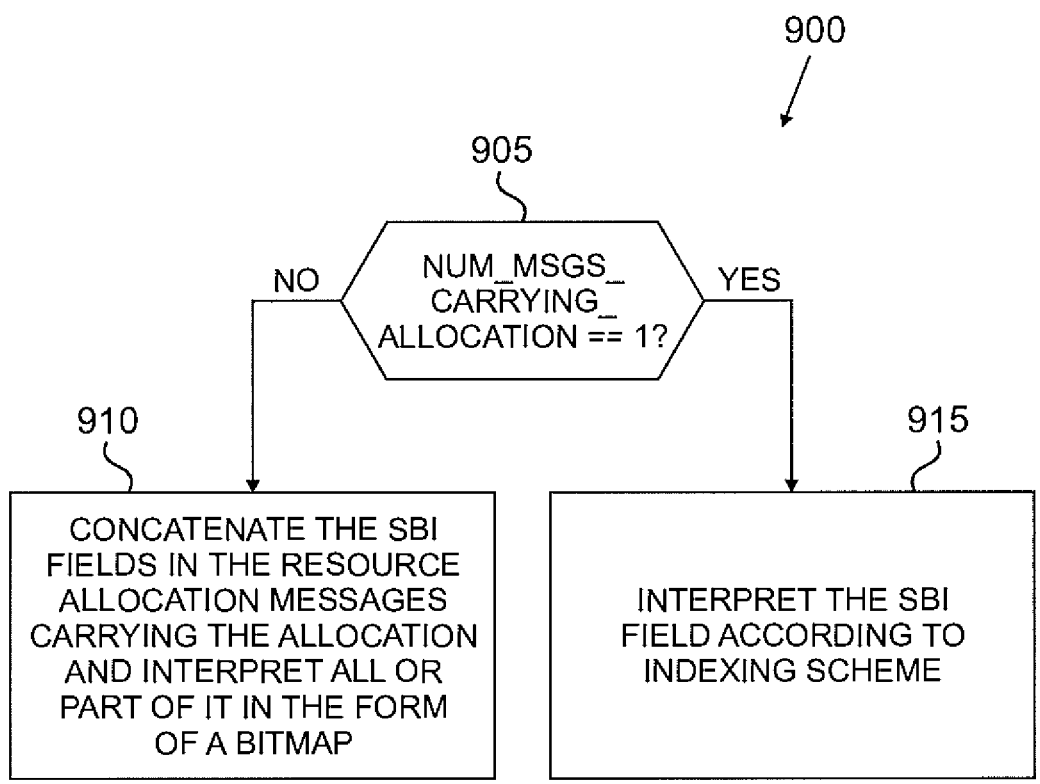

FIG. 9 illustrates the process for interpreting resource allocations according to embodiments of the present disclosure. The embodiment of the process 700 shown in FIG. 7 is for illustration only. Other embodiments could be used without departing from the scope of this disclosure.

In some embodiments, CONTIGUOUS_ALLOCATION_INDICATOR (i.e., the CAI 605) is not included in the resource allocation message. Accordingly, SS 116 is configured to implicitly determine the CAT 605.

SS 116 receives the resource allocation message 600 from BS 102. The resource allocation message includes the number of messages indicator 610, and the SBI field 615 but does not include the CAI 605. In block 905, SS 116 determines if the number of messages indicator 610 indicates that the allocation is included in only one message. For example, SS 116 determines if "NUM_MSGS_CARRYING_ALLOCATION=1."

If SS 116 determines that more than one message includes the allocation, that is "NUM_MSGS_CARRYING_ALLOCATION>1," then SS 116 concatenates the SBI field 615 in block 910. SS 116 concatenates all the SBI fields 615 in all the resource allocation messages carrying the allocation. SS 116 can interpret all or parts of the allocations in form of a bitmap. For example, each position in the concatenated SBI field 615 can correspond to a logical index of a particular SB 400. A "1" can indicate that the corresponding SB has been allocated and a "0" can indicate that the corresponding SB 400 has not been allocated.

If SS 116 determines that only one message includes the allocation, that is "NUM_MSGS_CARRYING_ALLOCATION=1," then SS 116 interprets the SBI field 615 according to an indexing scheme in block 915. The indexing scheme provides an allocation of SBs 400.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a mobile station capable of communicating with at least one base station in the wireless network, the mobile station comprising:
a plurality of antennas; and
a controller coupled to the plurality of antennas, the controller configured to receive an allocation of a set of sub-bands including at least one sub-band for use in communicating with the at least one base station, wherein the controller is configured to receive at least one resource allocation message from the at least one base station, the at least one resource allocation message comprising:
a sub-band index (SBI) field, and
at least one message field comprising a contiguous allocation indicator,
wherein the controller is configured to determine the set of sub-bands including at least one sub-band using the SBI field and the at least one message field, and
wherein the controller is configured to use the contiguous allocation indicator to interpret the SBI field according to at least one of: a contiguous indexing scheme and a non-contiguous indexing scheme.

2. The mobile station as set forth in claim 1, wherein when the controller identifies the SBI field according to the contiguous indexing scheme, the controller is configured to determine a lowest logical index among the set of sub-bands including at least one sub-band and a highest logical index among the set of sub-bands including at least one sub-band.

3. The mobile station as set forth in claim 2, wherein the at least one set of sub-bands comprises a plurality of sub-bands with contiguous logical indices beginning with the lowest logical index and ending with the highest logical index.

4. The mobile station as set forth in claim 1, wherein the controller identifies the SBI field according to the non-contiguous indexing scheme, the controller is configured to use at least one look-up table to determine the at least one set of sub-bands.

5. The mobile station as set forth in claim 4, wherein the at least one set of sub-bands comprises a plurality of non-contiguous sub-bands.

6. For use in a wireless communication network, a mobile station capable of communicating with at least one base station in the wireless network, the mobile station comprising:
a plurality of antennas; and
a controller coupled to the plurality of antennas, the controller configured to receive an allocation of a set of sub-bands including at least one sub-band for use in communicating with the at least one base station, wherein the controller is configured to receive at least one resource allocation message from the at least one base station, the at least one resource allocation message comprising:
a sub-band index (SBI) field, and
at least one message field comprising a number of messages indicator,
wherein the controller is configured to determine the set of sub-bands including at least one sub-band using the SBI field and the at least one message field, and
wherein the number of messages indicator is configured to identify a number of resource allocation messages carrying information about a particular resource allocation.

7. For use in a wireless communication network, a mobile station capable of communicating with at least one base station in the wireless network, the mobile station comprising:
a plurality of antennas; and
a controller coupled to the plurality of antennas, the controller configured to receive an allocation of a set of sub-bands including at least one sub-band for use in communicating with the at least one base station, wherein the controller is configured to receive at least one resource allocation message from the at least one base station, the at least one resource allocation message comprising:
a sub-band index (SBI) field, and
at least one message field comprising at least one of: a contiguous allocation indicator and a number of messages indicator,
wherein the controller is configured to determine the set of sub-bands including at least one sub-band using the SBI field and the at least one message field, and
wherein the controller is configured to concatenate a first SBI from a first resource allocation message conveying a particular resource allocation and a second SBI from a second resource allocation message conveying the particular resource allocation.

8. The mobile station as set forth in claim 7, wherein the controller is configured to interpret a portion of the concatenated SBI as a bitmap to determine the at least one set of sub-bands.

9. For use in a wireless communication network, a mobile station capable of communicating with at least one base station in the wireless network, the mobile station comprising:
a plurality of antennas; and
a controller coupled to the plurality of antennas, the controller configured to receive an allocation of a set of sub-bands including at least one sub-band for use in communicating with the at least one base station, wherein the controller is configured to receive at least one resource allocation message from the at least one base station, the at least one resource allocation message comprising:

a sub-band index (SBI) field, and
at least one message field comprising at least one of: a contiguous allocation indicator and a number of messages indicator,
wherein the controller is configured to determine the set of sub-bands including at least one sub-band using the SBI field and the at least one message field, and
wherein the controller is configured to at least one of:
implicitly determine whether the at least one set of sub-bands comprises a plurality of contiguous sub-bands or a plurality of non-contiguous sub-bands; and
implicitly determine a number of messages indicator configured to identify a number of allocation messages carrying allocation information.

10. For use in a wireless communication network, a method for communicating with at least one base station in the wireless network, the method comprising:
receiving at least one resource allocation message from the at least one base station, wherein the at least one resource allocation message is configured to identify an allocation of a set of sub-bands including at least one sub-band for use in communicating with the at least one base station, the at least one resource allocation message comprising:
a sub-band index (SBI) field, and
at least one message field comprising a continuous allocation indicator;
determining the set of sub-bands including at least one sub-band using the SBI field and the at least one message field; and
using the contiguous allocation indicator to interpret the SBI field according to at least one of: a contiguous indexing scheme and a non-contiguous indexing scheme.

11. The method as set forth in claim 10, wherein determining the at least one set of sub-bands further comprises:
interpreting the SBI field according to the contiguous indexing scheme by determining a lowest logical index among the set of sub-bands including at least one sub-band and a highest logical index among the set of sub-bands including at least one sub-band, and determining the set of sub-bands with contiguous logical indices beginning with the lowest logical index and ending with the highest logical index.

12. The method as set forth in claim 10, wherein determining the at least one set of sub-bands further comprises:
interpreting the SBI field according to the non-contiguous indexing scheme by using at least one look-up table to determine the at least one set of sub-bands.

13. For use in a wireless communication network, a method for communicating with at least one base station in the wireless network, the method comprising:
receiving at least one resource allocation message from the at least one base station, wherein the at least one resource allocation message is configured to identify an allocation of a set of sub-bands including at least one sub-band for use in communicating with the at least one base station, the at least one resource allocation message comprising:
a sub-band index (SBI) field, and
at least one message field comprising at least one of: a contiguous allocation indicator and a number of messages indicator; and
determining the set of sub-bands including at least one sub-band using the SBI field and the at least one message field,
wherein the at least one set of sub-bands comprises one of: a plurality of non-contiguous sub-bands and a plurality of contiguous sub-bands.

14. For use in a wireless communication network, a method for communicating with at least one base station in the wireless network, the method comprising:
receiving at least one resource allocation message from the at least one base station, wherein the at least one resource allocation message is configured to identify an allocation of a set of sub-bands including at least one sub-band for use in communicating with the at least one base station, the at least one resource allocation message comprising:
a sub-band index (SBI) field, and
at least one message field comprising at least one of: a contiguous allocation indicator and a number of messages indicator;
determining the set of sub-bands including at least one sub-band using the SBI field and the at least one message field; and
identifying a number of resource allocation messages carrying information about a particular resource allocation.

15. The method as set forth in claim 14, wherein determining the set of sub-bands further comprises: concatenating a first SBI from a first resource allocation message conveying a particular resource allocation and a second SBI from a second resource allocation message conveying the particular resource allocation.

16. The method as set forth in claim 15, wherein determining the set of sub-bands further comprises: interpreting a portion of the concatenated SBI as a bitmap.

17. For use in a wireless communication network, a base station capable of communicating with at least one mobile station in the wireless network, the base station comprising:
a plurality of antennas; and
a controller coupled to the plurality of antennas, the controller configured to allocate a set of sub-bands including at least one sub-band to the at least one mobile station, wherein the controller is configured to transmit at least one resource allocation message to the at least one mobile station, the at least one resource allocation message comprising:
a sub-band index (SBI) field, and
at least one message field comprising a contiguous allocation indicator configured to identify an indexing scheme to be used to interpret the SBI field,
wherein the at least one resource allocation message is configured to be used to determine the set of sub-bands including at least one sub-band based on the SBI field and the at least one message field.

18. The base station as set forth in claim 17, wherein the indexing scheme comprises at least one of: a contiguous indexing scheme and a non-contiguous indexing scheme.

19. For use in a wireless communication network, a base station capable of communicating with at least one mobile station in the wireless network, the base station comprising:
a plurality of antennas; and
a controller coupled to the plurality of antennas, the controller configured to allocate a set of sub-bands including at least one sub-band to the at least one mobile station, wherein the controller is configured to transmit at least one resource allocation message to the at least one mobile station, the at least one resource allocation message comprising:
a sub-band index (SBI) field, and
at least one message field comprising a number of messages indicator configured to identify a number of resource allocation messages carrying information about a particular resource allocation, wherein the at least one resource allocation message is configured to be used to determine the set of sub-bands including at least one sub-band based on the SBI field and the at least one message field.

20. For use in a base station in a wireless communication network, a method for communicating with at least one subscriber station in the wireless network, the method comprising:

transmitting, by the base station, at least one resource allocation message to the at least one subscriber station, wherein the at least one resource allocation message is configured to identify an allocation of a set of sub-bands including at least one sub-band for use in communicating by the at least one subscriber station, the at least one resource allocation message comprising:

a sub-band index (SBI) field, and at least one message field comprising at least one of: a contiguous allocation indicator and a number of messages indicator, wherein the at least one resource allocation message is configured to be used to determine the set of sub-bands including at least one sub-band based on the SBI field and the at least one message field, and wherein transmitting further comprises including in the at least one message field the contiguous allocation indicator configured to identify an indexing scheme to be used to interpret the SBI field.

21. The method as set forth in claim 20, wherein the indexing scheme comprises at least one of: a contiguous indexing scheme and a non-contiguous indexing scheme.

22. The method as set forth in claim 20, wherein transmitting further comprises including in the at least one message field a number of messages indicator configured to identify a number of resource allocation messages carrying information about a particular resource allocation.

23. For use in a base station in a wireless communication network, a method for communicating with at least one subscriber station in the wireless network, the method comprising:

transmitting, by the base station, at least one resource allocation message to the at least one subscriber station, wherein the at least one resource allocation message is configured to identify an allocation of a set of sub-bands including at least one sub-band for use in communicating by the at least one subscriber station, the at least one resource allocation message comprising:

a sub-band index (SBI) field, and at least one message field comprising at least one of: a contiguous allocation indicator and a number of messages indicator, wherein the at least one resource allocation message is configured to be used to determine the set of sub-bands including at least one sub-band based on the SBI field and the at least one message field, and wherein the at least one set of sub-bands comprises one of: a plurality of non-contiguous sub-bands and a plurality of contiguous sub-bands.

24. For use in a base station in a wireless communication network, a method for communicating with at least one subscriber station in the wireless network, the method comprising:

transmitting, by the base station, at least one resource allocation message to the at least one subscriber station, wherein the at least one resource allocation message is configured to identify an allocation of a set of sub-bands including at least one sub-band for use in communicating by the at least one subscriber station, the at least one resource allocation message comprising:

a sub-band index (SBI) field, and at least one message field comprising at least one of: a contiguous allocation indicator and a number of messages indicator, wherein the at least one resource allocation message is configured to be used to determine the set of sub-bands including at least one sub-band based on the SBI field and the at least one message field, and wherein transmitting comprises transmitting in the resource allocation message the number of resource allocation messages carrying information about a particular resource allocation.

25. The method as set forth in claim 24, wherein transmitting the number of resource allocation messages carrying information about a particular resource allocation further comprises: including a first SBI field in a first resource allocation message conveying a particular resource allocation and a second SBI field in a second resource allocation message conveying the particular resource allocation, the SBI fields in the number of resource allocation messages carrying information about a particular resource allocation configured to be concatenated by the at least one subscriber station to determine the at least one set of sub-bands.

26. The method as set forth in claim 25, wherein transmitting the number of resource allocation messages carrying information about a particular resource allocation further comprises: transmitting a portion of the SBI configured to be interpreted after concatenation as a bitmap indicating the set of allocated sub-bands.

27. For use in a wireless communication network, a mobile station capable of communicating with at least one base station in the wireless network, the mobile station comprising:

a plurality of antennas; and a controller coupled to the plurality of antennas, the controller configured to receive an allocation of a set of sub-bands including at least one sub-band for use in communicating with the at least one base station, wherein the controller is configured to receive at least one resource allocation message from the at least one base station, the at least one resource allocation message comprising:

a resource allocation (RA), and at least one message field comprising at least one of: a contiguous allocation indicator and a number of messages indicator, wherein the controller is configured to, at least one of:

utilize at least two resource allocation messages to indicate three sub-bands, determine a number of resource allocation messages to utilize, and configure the resource allocation to be concatenated if using two or more resource allocation messages.

* * * * *